United States Patent
Spagna

(10) Patent No.: US 6,896,133 B2
(45) Date of Patent: May 24, 2005

(54) ANTI-THEFT COMPACT DISC/DVD STORAGE CASE

(76) Inventor: Richard J. Spagna, 5158 NW. 52nd St., Coconut Creek, FL (US) 33073

( * ) Notice: Subject to any disclaimer, the term of this patent is extended or adjusted under 35 U.S.C. 154(b) by 14 days.

(21) Appl. No.: 10/219,171

(22) Filed: Aug. 14, 2002

(65) Prior Publication Data

US 2004/0031708 A1 Feb. 19, 2004

(51) Int. Cl.$^7$ .............................................. B65D 85/57
(52) U.S. Cl. ..................... 206/308.2; 206/1.5; 206/310; 24/704.1; 70/57.1
(58) Field of Search ..................... 206/1.5, 307, 308.1, 206/308.2, 308.3, 303, 309, 310, 311, 493; 70/57.1, 63; 24/704.1, 706.8, 704.2; 53/467, 468, 473

(56) References Cited

U.S. PATENT DOCUMENTS

| | | | |
|---|---|---|---|
| 3,862,555 A | | 1/1975 | Wirth |
| 3,927,765 A | | 12/1975 | Beal |
| 4,425,999 A | | 1/1984 | MacDonald et al. |
| 4,499,994 A | | 2/1985 | Rentch |
| 4,502,598 A | * | 3/1985 | Wartenbergh ............. 206/308.3 |
| 4,516,678 A | * | 5/1985 | Fotiadis et al. .......... 206/308.3 |
| 4,523,356 A | * | 6/1985 | Charlot, Jr. ................ 24/706.8 |
| 4,635,797 A | | 1/1987 | Bankier |
| 4,658,955 A | | 4/1987 | Eichner |
| 4,670,950 A | * | 6/1987 | Wisecup et al. ............. 70/57.1 |
| 4,682,690 A | | 7/1987 | Tiffany |
| 4,700,839 A | * | 10/1987 | Fujii ....................... 206/308.3 |
| 4,709,813 A | | 12/1987 | Wildt |
| 4,750,618 A | | 6/1988 | Schubert |
| 4,805,769 A | | 2/1989 | Soltis et al. |
| 4,819,797 A | | 4/1989 | Holmgren |
| 4,834,238 A | | 5/1989 | Hehn et al. |
| 5,085,318 A | | 2/1992 | Leverick |
| 5,363,962 A | * | 11/1994 | Toral et al. ................. 206/303 |
| 5,385,231 A | | 1/1995 | Nowotny |
| 5,426,419 A | | 6/1995 | Nguyen et al. |
| 5,462,159 A | | 10/1995 | Roth et al. |
| 5,517,178 A | | 5/1996 | Rodrigues |
| 5,528,914 A | | 6/1996 | Nguyen et al. |
| 5,535,606 A | | 7/1996 | Nguyen et al. |
| 5,551,559 A | * | 9/1996 | Roth et al. ................ 206/308.1 |
| 5,601,188 A | | 2/1997 | Dressen et al. |
| 5,782,350 A | | 7/1998 | Weisburn et al. |
| 5,894,924 A | | 4/1999 | Koch |
| 5,896,985 A | | 4/1999 | Nakasuji |
| 5,904,246 A | | 5/1999 | Weisburn et al. |
| 5,934,114 A | | 8/1999 | Weisburn et al. |
| 6,016,909 A | | 1/2000 | Chang |
| 6,065,593 A | | 5/2000 | Howerton et al. |
| 6,092,401 A | | 7/2000 | Sankey et al. |
| 6,102,200 A | | 8/2000 | Dressen et al. |
| 6,112,894 A | * | 9/2000 | Kikuchi et al. .......... 206/308.1 |
| 6,283,280 B1 | | 9/2001 | Wong et al. |
| 6,373,390 B1 | | 4/2002 | Hogan et al. |
| 6,382,413 B1 | | 5/2002 | Nakamura et al. |
| 6,435,343 B1 | * | 8/2002 | Wu et al. ................ 206/308.1 |
| 2002/0096442 A1 | | 7/2002 | Myszka et al. |
| 2002/0189961 A1 | | 12/2002 | Myszka et al. |

* cited by examiner

*Primary Examiner*—Luan K. Bui
(74) *Attorney, Agent, or Firm*—Kevin P. Crosby, Esq.; Daniel C. Crilly, Esq.; Brinkley, McNerney, et al.

(57) ABSTRACT

A storage case or receptacle used to secure CDs and DVDs used in rental or purchase applications. The case is comprised of a housing having a lid and a base between which is removably positionable a CD, DVD or the like. A releasable locking mechanism retains the lid and base in position in surrounding relationship about the CD or DVD. The locking mechanism may be of any type, such as some of the various security tag locks commonly used in the electronic article surveillance ("EAS") industry.

22 Claims, 3 Drawing Sheets

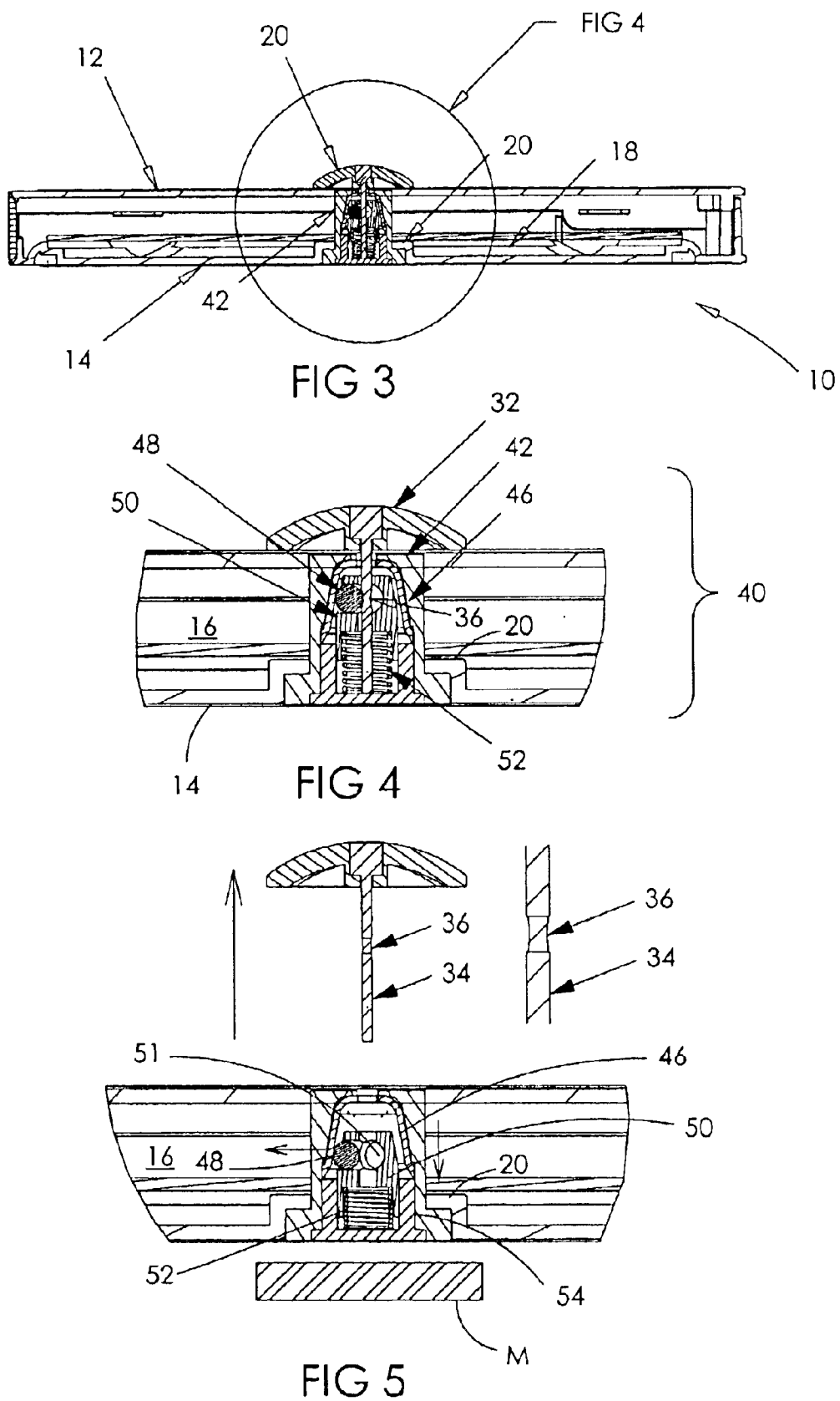

ANTI-THEFT COMPACT DISC/DVD STORAGE CASE

BACKGROUND OF THE INVENTION

1. Field of the Invention

This invention relates generally to storage receptacles, and more particularly relates to storage receptacles adapted to house articles such as compact discs ("CDs") and digital video discs ("DVDs") having an anti-theft lock associated therewith.

2. Background Art

In the leasing of CDs and DVDs to the public, it has become the commonly accepted practice to store and display the CD or DVD in a relatively inexpensive transparent or translucent plastic storage case which may or may not also support or house and electronic article surveillance ("EAS") tag or label. The CDs and DVDs, by being placed on shelves in the retail-leasing establishment, are exposed to and susceptible of pilferage. All one need do is open the storage case which contains the valuable CD or DVD and remove the CD or DVD and walk out of the establishment undetected.

There is, therefore, a need for a locking CD or DVD storage container.

U.S. Pat. No. 5,031,756 to Buzzard, et al, discloses a "keeper" for a package containing an article. The "article" is disclosed as being a CD jewel case. The keeper prevents the package from being opened, thereby preventing the article (i.e. jewel case) from being removed from the package. However, the Buzzard invention requires the provision of a complicated package and hinge assembly thereof.

Therefore, there is a need for a CD and DVD storage and display case which will prevent the unauthorized removal of the CD or DVD but which is easily disabled by authorized personnel using a simple detachment device.

SUMMARY OF THE INVENTION

The instant invention is drawn to a storage case or receptacle used to secure CDs and DVDs used in rental applications. The case is comprised of a housing having a lid and a base between which is removably positionable a CD, DVD or the like. A releasable locking mechanism retains the lid and base in position in surrounding relationship about the CD or DVD. The locking mechanism may be of any type, such as some of the various security tags commonly used in the electronic article surveillance ("EAS") industry.

In order to use the invention, a CD or DVD, which is on display in a rental facility such as a rental store, is housed in the case of the instant invention. The locking mechanism is secured about the lid and base of the case. A prospective renter, upon choosing his or her CD or DVD selection to rent, picks up the case with the CD or DVD encased therein and brings it to a checkout counter. The store employee, as part of the transaction, accepts consideration for the rental of the CD or DVD and disables the locking mechanism and any EAS tag associated with the case. This allows the renter to leave the premises without setting off any EAS alarms and open the case to obtain access to the CD or DVD.

It is, therefore, a primary object of this invention to provide a CD or DVD storage case having an incorporated security feature.

It is also an object of this invention to provide an article storage case, the interior of which can only be accessed by disablement of an integrated locking mechanism.

It is a further object of this invention to provide a CD or DVD storage case which is compatible with industry storage, display and vending standards yet which provides an anti-theft feature.

It is a still further object of this invention to provide a CD and DVD storage case incorporating a theft deterrent feature which can be easily disabled by an authorized person (e.g. store employee) using readily available technology.

These and other objects and features of the invention will be more readily understood from a consideration of the following detailed description, taken with the accompanying drawings, in which corresponding parts are indicated by corresponding numerals.

BRIEF DESCRIPTION OF THE DRAWINGS

FIG. 3 is an assembled cross-sectional elevational view of the invention of FIG. 1.

FIG. 4 is an enlargement of the area of detail shown in FIG. 3.

FIG. 5 is an enlargement of the area of detail shown in FIG. 3 with the locking pin removed.

DETAILED DESCRIPTION OF A PREFERRED EMBODIMENT

Figure 1:
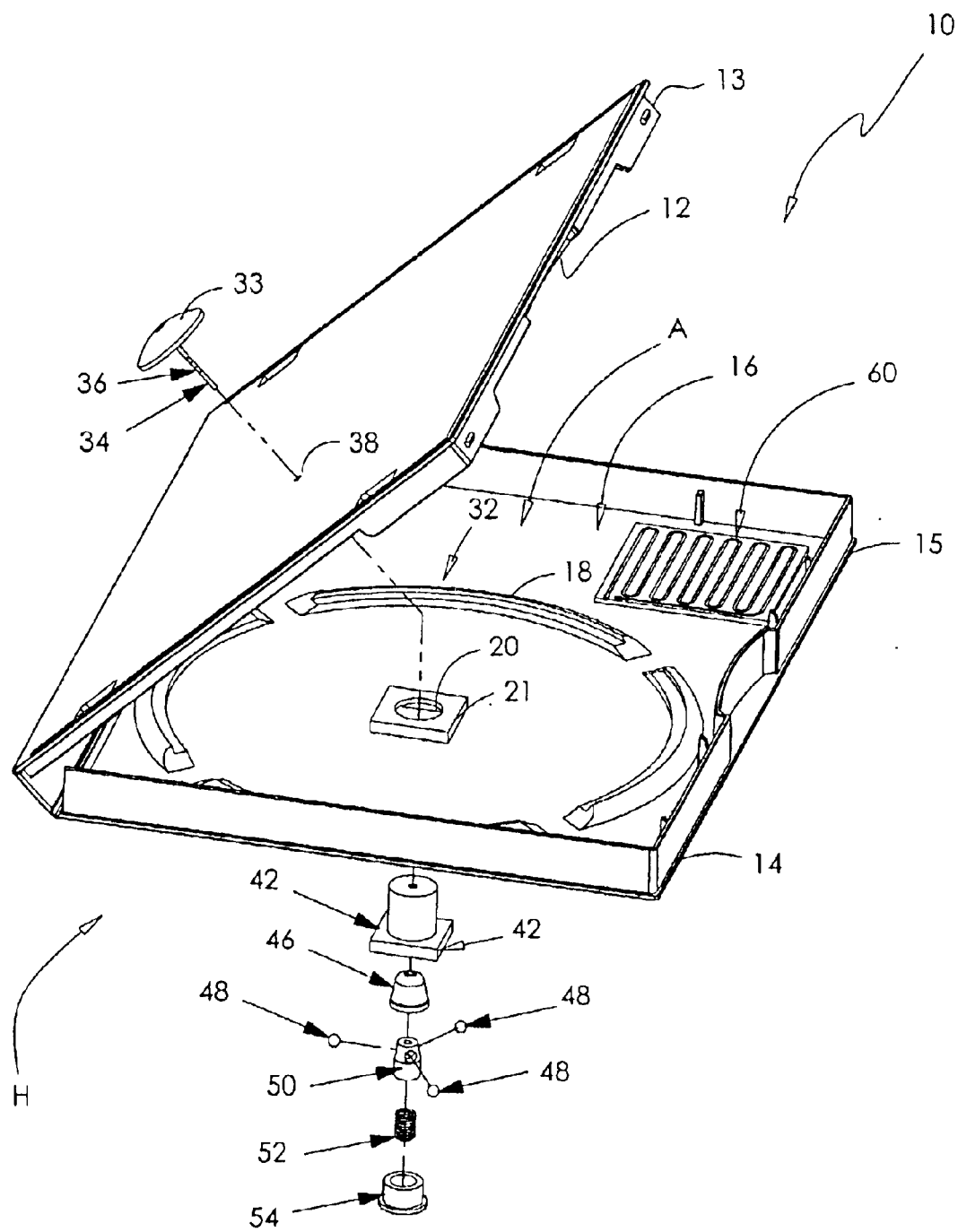
FIG. 1 is a perspective exploded view of a preferred embodiment of the invention.
Figure 2:
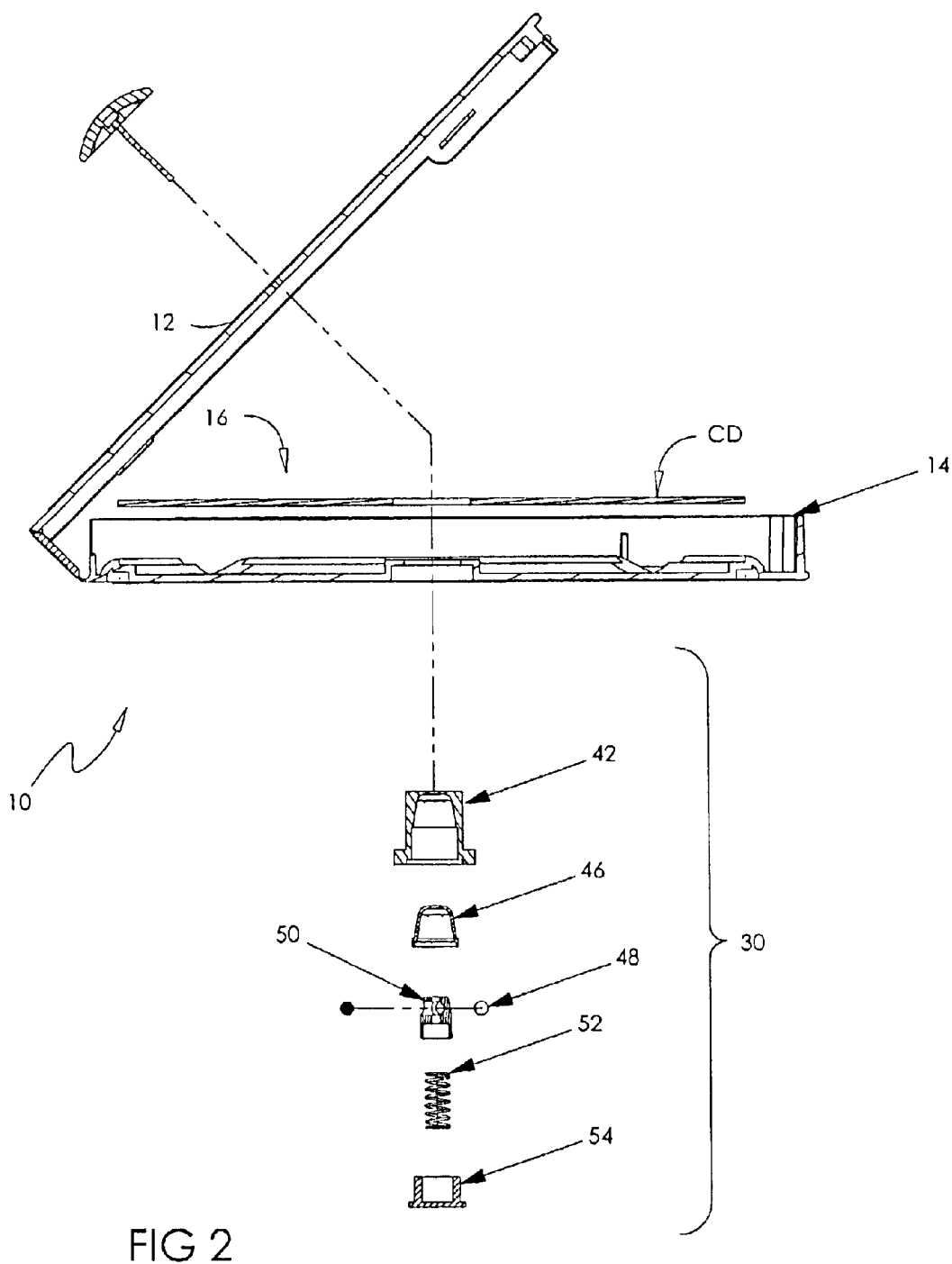
FIG. 2 is an exploded elevational view of the invention of FIG. 1.

Referring now to the drawings, FIGS. 1–5 depict the best mode of practicing the invention. It is to be understood, however, that departures may be made in the specific structural assembly of the invention without departing form the spirit and scope of the invention.

In general, the invention is a secure CD and DVD storage case 10 comprised of a housing H which includes a top or lid 12 and a bottom or lower housing half 14. Top 12 and bottom 14 may or may not be hingedly associated with one another. When top 12 and bottom 14 are in the closed position relative to each other, i.e. attached about their respective edges 13 and 15, a hollow inner cavity 16 is formed within which a CD or DVD 25 may be stored.

Bottom 14 may (but not necessarily) define a raised circular shoulder 18 adapted to receive in concentric relationship the CD or DVD. In addition, a raised annular ledge, concentrically with shoulder 18 but having a smaller diameter, may be provided in associated with bottom 14 having a circular cutout therein for purposes to be set forth more fully below.

A locking mechanism 40 is utilized to retain housing top 12 in the closed position with respect to bottom 14. The locking mechanism may be of any configuration which will occur to one of ordinary skill in the art. All that is required is that it permit the releasable locking of top 12 about bottom 14 while at the same time retaining the CD or DVD in association with the housing H in a secure manner.

In the preferred embodiment, but not by way of limitation, the locking mechanism 40 is a pin and clutch lock arrangement which employs a pin 32 having a flared or enlarged head member 33 attached to a slender rod 34 connected thereto. Rod 34 defines an annular groove 36 therein.

Pin 32 is adapted to be releaseably received by one or more locking elements 48 which are loosely positioned within a clutch body 50. Clutch body 50 is preferably constructed of a material or materials which is/are susceptible of attraction by magnet. Clutch body 50 is in turn generally surrounded by a clutch cup 46, which in turn is positioned within a hub 42 attached to shoulder 21 and positioned through aperture 20. A compression spring 52 is positioned in registry with clutch body 50 in such a way that it is sandwiched between clutch body 50 and a spring retaining cup 54.

As best seen in FIG. 4, in order to lock the CD or DVD within housing H, the CD or DVD 25 is placed upon shoulder 18 and lid 12 closed about bottom 14. Rod 34 is then passed through aperture 38 defined by top 12, which is in registry with corresponding openings in CD or DVD 25, hub 42, cup 46 and clutch body 50. The tapering interior sidewalls of cup 46 cause locking elements 48, which in the instant application are spheres made of any suitable material such as metal or plastic, to be forced into engagement with groove 36 due to the fact that compression spring 52 forces clutch body 50 upwardly against the force of rod 34 being pressed there into. Spring receiving cup 54 may be ultrasonically welded to bottom 14 and/or to hub 42, or is otherwise integrally connected to bottom 14 so as to stay substantially fixed relative thereto. The diameter of the upper portion of hub 42 corresponds generally to but is slightly less than the diameter of the standard aperture in CD or DVD 25. The diameter of the lower portion of hub 42 corresponds generally to the dimension of annular shoulder 21. Lower portion 42' of hub 42 may be of any shape, that is, circular, rectangular, triangular, or any other suitable shape and still fall within the scope of the invention.

Once rod 34 is connected to clutch body 50, positioning a magnet M below bottom 14 of housing H as shown in FIG. 5 will cause clutch body 50 to be attracted by the magnet and overcome the spring force of spring 50 and hence translate toward spring retaining cup 54, and away from clutch cup 48, permitting locking element(s) 48 to move radially outwardly in corresponding journals 51 defined by clutch body 50 relative to pin 34. In this way, element(s) 48 is/are released from engagement with groove 36, permitting pin 32 to be freely removed from clutch body 50. This in turn permits top 12 to be removed and the CD or DVD 25 to be removed from or placed within cavity 16.

Optionally, an EAS element 60 may be provided for added security against unauthorized removal of case 10 from a secure location such as a retail store. EAS element 60 may be any of the known devices utilized in the EAS industry such as a radio frequency ("RF") tag or the like.

It can therefore be appreciated that, in order to significantly add to the theft deterrence properties of a case for storing rental CDs and DVDs, the instant invention is employed. The store employee simply exposes the underside of bottom 14 to a magnet of sufficient strength to cause clutch body 50 to overcome the spring force of spring 52 and move downwardly with respect to clutch cup 46. Upon the occurrence of the foregoing, pin 32 may be removed from clutch body 50. The employee can then simply place pin 32 in a drawer or other storage receptacle, where it will take up very little storage space. The renter can then leave the store (after any EAS tag or label has been deactivated) and is able to open housing H and gain access to the CD or DVD stored therein for the purpose of playing it. Upon return of the case 10 with the CD or DVD placed there within, a store employee need only replace pin 32 within clutch body 50, thereby locking housing H in the closed position with the CD or DVD stored inside. The device 10 can then be placed back on the shelf for display and subsequent rental to another customer.

It is to be understood that the instant invention can be utilized in circumstances other than rental transactions. For example, the case of the instant invention may be used to store and display CDs or DVDs which are for sale, and the apparatus and methods disclosed herein apply equally as well.

Various modifications and alterations of this invention will become apparent to those skilled in the art without departing from the scope and spirit of this invention, and it is understood that this invention is not limited to the illustrative embodiments set forth hereinbefore.

What is claimed is:

1. A storage case for a CD or DVD, the CD or DVD defining a pre-existing aperture, the storage case comprising:

a housing including a first housing portion and a second housing portion, each of the first housing portion and the second housing portion being sized and shaped to cover at least an entire surface of the CD or DVD, and the housing being arranged to substantially enclose the CD or DVD when the first housing portion is placed in a closed position with respect to the second housing portion;

a locking assembly for locking the first housing portion in association with the second housing portion, the locking assembly including:

a female locking member connected to the first housing portion such that the female locking member is substantially in registry with the pre-existing aperture of the CD or DVD when the CD or DVD is placed within the housing; and a male locking member adapted to be placed through an aperture in the second housing portion and thereafter into releasable locking engagement with the female locking member to retain the first housing portion in the closed position with respect to the second housing portion, thereby retaining the CD or DVD securely within the housing, wherein the female locking member includes a clutch lock comprised of a clutch body, a clutch cup disposed in at least partial surrounding relationship about the clutch body, and a means for biasing the clutch body toward the clutch cup; at least one clutch element movable between a first position and a second position; the male locking member including a generally slender rod adapted to be positioned through the clutch cup and into an interior channel defined by the clutch body, the rod defining a notch in registry with the at least one clutch element; the clutch body being movable between a raised position in which the means for biasing forces the at least one clutch element into engagement with the clutch cup, and a lowered position brought about by an external force moving the clutch body away from the clutch cup such that the at least one clutch element is caused to disengage the notch in the rod, thereby permitting the rod to be removed from the clutch body.

2. The storage case of claim 1, wherein at least one of the male and female locking members passes through the pre-existing aperture of the CD or DVD.

3. The storage case of claim 1, further comprising an EAS tag connected to the housing.

4. The storage case of claim 1, wherein the housing further includes a circular shoulder connected to the first housing portion, the shoulder being adapted to receive in concentric relationship the CD or DVD and the female locking member being centrally positioned in an area substantially surrounded by the shoulder.

5. The storage case of claim 1, wherein the male locking member is independent of and separated from the housing and the female locking member prior to engagement with the female locking member.

6. A lockable storage case for a CD or DVD, the CD or DVD defining a pre-existing aperture, the storage case comprising:

a housing having a first housing half and a second housing half which form a hollow inner cavity adapted to substantially enclose the CD or DVD when combined;

a female locking member fixedly connected to the first housing half and defining an opening, the female locking member positioned to be substantially in registry with the pre-existing aperture of the CD or DVD when the CD or DVD is placed within the housing;

an aperture defined by the second housing half substantially in registry with the opening in the female locking member when the first housing half and the second housing half are combined; and a male locking member including a slender rod sized and shaped to be removably positioned through the aperture in the second housing half and the opening in the female locking member, wherein the male locking member and the female locking member cooperate to retain the CD or DVD securely within the housing and wherein the female locking member includes a clutch lock comprised of a clutch body, a clutch cup disposed in at least partial surrounding relationship about the clutch body, and a means for biasing the clutch body toward the clutch cup; at least one clutch element movable between a first position and a second position; the rod of the male locking member adapted to be positioned through the clutch cup and into an interior channel defined by the clutch body, the rod defining a notch generally in registry with the at least one clutch element; the clutch body being movable between a raised position in which the means for biasing forces the at least one clutch element into engagement with the clutch cup, and a lowered position brought about by an external force exceeding an opposing force exerted by the means for biasing moving the clutch body away from the clutch cup such that the at least one clutch element is caused to disengage the notch in the rod, thereby permitting the rod to be removed from the clutch body.

7. The storage case of claim 6, wherein at least one of the male and female locking members is positioned through the pre-existing aperture in the CD or DVD.

8. The storage case of claim 6, further comprising an EAS tag connected to the housing.

9. The storage case of claim 6, wherein the housing further includes a circular shoulder connected to the first housing half, the shoulder being adapted to receive in concentric relationship the CD or DVD and the female locking member being centrally positioned in an area substantially surrounded by the shoulder.

10. The storage case of claim 6, wherein the male locking member is independent of and separated from the housing and the female locking member until the slender rod of the male locking member is positioned through the opening in the female locking member.

11. The storage case of claim 9, further comprising an EAS tag connected to the housing.

12. The storage case of claim 9, wherein the male locking member is independent of and separated from the housing and the female locking member until the slender rod of the male locking member is positioned through the opening in the female locking member.

13. A lockable storage case for a CD or DVD, said CD or DVD defining a central aperture therein, the storage case comprising:

a housing having a first housing half and a second housing half which are hingedly connected and form a hollow inner cavity adapted to substantially enclose the CD or DVD when arranged in a closed position, the first housing half including a circular shoulder adapted to receive in concentric relationship the CD or DVD;

a female locking member integrally connected to the first housing half and defining an opening, the female locking member being centrally positioned in an area substantially surrounded by the shoulder such that the female locking member is in registry with the aperture in the CD or DVD when the CD or DVD is situated within the cavity;

an aperture defined by the second housing half substantially in registry with the opening in the female locking member when the first housing half and the second housing half are combined; and a male locking member including a slender rod sized and shaped to be passed through the aperture in the second housing half, the opening in the CD or DVD and the opening in the female locking member and releaseably retained therein to thereby lockingly sandwich the CD or DVD between the first housing half and the second housing half, the the male locking member being independent of and separated from the housing and the female locking member until the slender rod of the male locking member is passed through the opening in the female locking member, wherein the female locking member includes a clutch lock comprised of a clutch body, a clutch cup disposed in at least partial surrounding relationship about the clutch body, and a means for biasing the clutch body toward the clutch cup; at least one clutch element movable between a first position and a second position; the rod of the male locking member adapted to be positioned through the clutch cup and into an interior channel defined by the clutch body, the rod defining a notch generally in registry with the at least one clutch element; the clutch body being movable between a raised position in which the means for biasing forces the at least one clutch element into engagement with the clutch cup, and a lowered position brought about by an external force exceeding an opposing force exerted by the means for biasing moving the clutch body away from the clutch cup such that the at least one clutch element is caused to disengage the notch in the rod, thereby permitting the rod to be removed from the clutch body.

14. A method for securely storing, displaying and leasing CDs and DVDs employing a CD and DVD storage case utilizing a locking mechanism for preventing unauthorized removal of the CD or DVD from the storage case, said CDs and DVDs defining central apertures therein, the case including a housing having an upper housing half and a lower housing half which form a hollow inner cavity adapted to receive a CD or DVD when combined, a female locking member defining an opening and connected to the lower housing half in registry with a central aperture in the CD or DVD when the CD or DVD is situated within the cavity, an aperture defined by the upper housing half substantially in registry with the opening in the female locking member when the upper housing half and lower housing half are combined, a male locking member including a slender rod sized and shaped to be passed through the aperture in the upper housing half and the opening in the female locking member and releaseably retained therein to thereby lockingly sandwich the CD or DVD between the upper housing half and lower housing half, wherein the female locking member includes a clutch lock comprised of a clutch body, a clutch cup disposed in at least partial surrounding relationship about the clutch body, and a means for biasing the clutch body toward the clutch cup; at least one clutch element movable between a first position and a second position, the rod of the male locking member adapted to be positioned through the clutch cup and into an interior channel defined by the clutch body, the rod defining a notch generally in registry with the at least one clutch element, the clutch body being movable between a raised position in which the means for biasing forces the at least one clutch element into engagement with the clutch cup, and a lowered position brought about by an external force exceeding an opposing force exerted by the means for biasing moving the clutch body away from the clutch cup such that the at least one clutch element is caused to disengage the notch in the rod, thereby permitting the rod to be removed from the clutch body, the method comprising the steps of:

placing a CD or DVD within the housing in such a way that the CD or DVD is sandwiched between the upper housing half and the lower housing half;

inserting the male locking member within the female locking member to thereby lock the CD or DVD to the locking mechanism and locking the upper housing half to the lower housing half in a closed position;

when a consumer desires to rent the CD or DVD stored within the housing, disabling the locking mechanism such that the male locking member is removed from the female locking member; and placing possession of the housing containing the CD or DVD in the possession of the consumer after receiving consideration from the consumer for rental of the CD or DVD.

15. The method of claim 14, further comprising the step of:

retaining, by a rental facility, possession of at least the male locking member during a rental transaction in which the CD or DVD is placed in the possession of the consumer.

16. A storage case for a CD or DVD, the CD or DVD defining a pre-existing central aperture, the storage case comprising:

a housing including a first housing portion and a second housing portion, each of the first housing portion and the second housing portion being sized and shaped to cover at least an entire surface of the CD or DVD, and the housing being arranged to substantially enclose the CD or DVD when the first housing portion is combined with the second housing portion;

a locking assembly for locking the first housing portion in association with the second housing portion, the locking assembly including:

a female locking member connected to the first housing portion such that the female locking member is substantially in registry with the pre-existing central aperture of the CD or DVD when the CD or DVD is placed within the housing; and a male locking member adapted to be placed through an aperture in the second housing portion and thereafter into releasable locking engagement with the female locking member to in turn sandwich the CD or DVD between the first housing portion and the second housing portion;

wherein the female locking member includes a clutch lock comprised of a clutch body, a clutch cup disposed in at least partial surrounding relationship about the clutch body, and a means for biasing the clutch body toward the clutch cup, at least one clutch element movable between a first position and a second position, the male locking member including a generally slender rod adapted to be positioned through the clutch cup and into an interior channel defined by the clutch body, the rod defining a notch in registry with the at least one clutch element, the clutch body being movable between a raised position in which the means for biasing forces the at least one clutch element into engagement with the clutch cup, and a lowered position brought about by an external force moving the clutch body away from the clutch cup such that the at least one clutch element is caused to disengage the notch in the rod, thereby permitting the rod to be removed from the clutch body.

17. A lockable storage case for a CD or DVD, the CD or DVD defining a pre-existing central aperture, the storage case comprising:

a housing having a first housing half and a second housing half which form a hollow inner cavity adapted to substantially enclose the CD or DVD when combined;

a female locking member fixedly connected to the first housing half and defining an opening, the female locking member positioned to be substantially in registry with the pre-existing aperture of the CD or DVD when the CD or DVD is placed within the housing;

an aperture defined by the second housing half substantially in registry with the opening in the female locking member when the first housing half and the second housing half are combined; and a male locking member including a slender rod sized and shaped to be removably positioned through the aperture in the second housing half and the opening in the female locking member and releasably retained therein to lockingly sandwich the CD or DVD between the first housing half and the second housing half;

wherein the female locking member includes a clutch lock comprised of a clutch body, a clutch cup disposed in at least partial surrounding relationship about the clutch body, and a means for biasing the clutch body toward the clutch cup, at least one clutch element movable between a first position and a second position, the rod of the male locking member adapted to be positioned through the clutch cup and into an interior channel defined by the clutch body, the rod defining a notch generally in registry with the at least one clutch element, the clutch body being movable between a raised position in which the means for biasing forces the at least one clutch element into engagement with the clutch cup, and a lowered position brought about by an external force exceeding an opposing force exerted by the means for biasing moving the clutch body away from the clutch cup such that the at least one clutch element is caused to disengage the notch in the rod, thereby permitting the rod to be removed from the clutch body.

18. A storage case for a CD or DVD, the CD or DVD defining a pre-existing aperture, the storage case comprising:

a housing including a first housing portion and a second housing portion, each of the first housing portion and the second housing portion being sized and shaped to cover at least an entire surface of the CD or DVD, and the housing being arranged to substantially enclose the CD or DVD when the first housing portion is placed in a closed position with respect to the second housing portion; and a locking assembly that includes:
   a female locking member connected to the first housing portion such that the female locking member is substantially in registry with the pre-existing aperture of the CD or DVD when the CD or DVD is placed within the housing; and
   a male locking member adapted to be placed into releasable locking engagement with the female locking member to retain the CD or DVD within the housing;

wherein the female locking member includes a clutch lock comprised of a clutch body, a clutch cup disposed in at least partial surrounding relationship about the clutch body, and a means for biasing the clutch body toward the clutch cup, at least one clutch element movable between a first position and a second position, the male locking member including a generally slender rod adapted to be positioned through the clutch cup and into an interior channel defined by the clutch body, the rod defining a notch in registry with the at least one clutch element, the clutch body being movable between a raised position in which the means for biasing forces the at least one clutch element into engagement with the clutch cup, and a lowered position brought about by an external force moving the clutch body away from the clutch cup such that the at least one clutch element is caused to disengage the notch in the rod, thereby permitting the rod to be removed from the clutch body.

19. The storage case of claim 18, further comprising an EAS tag connected to the housing.

20. The storage case of claim 18, wherein the male locking member is independent of and separated from the housing and the female locking member prior to engagement with the female locking member.

21. The storage case of claim 18, wherein at least one of the male and female locking members passes through the pre-existing aperture defined by the CD or DVD.

22. The storage case of claim 18, wherein the housing further includes a circular shoulder connected to the first housing portion, the shoulder being adapted to receive in concentric relationship the CD or DVD and the female locking member being centrally positioned in an area substantially surrounded by the shoulder.

* * * * *